Patented May 18, 1926.

1,585,090

UNITED STATES PATENT OFFICE.

ALPHONSE RAYMOND DOCHEZ, OF NEW YORK, N. Y., ASSIGNOR TO THE PRESBYTERIAN HOSPITAL IN THE CITY OF NEW YORK, OF NEW YORK, N. Y.

METHOD OF PREPARING ANTITOXIC SERA.

No Drawing. Application filed April 14, 1924. Serial No. 706,561.

This invention relates to sera of the antitoxic, as distinguished from the anti-bacterial, type; and comprises a general method by which such sera may be prepared. The invention includes also the serum effective for the treatment of scarlet fever.

The constant presence in the throats of individuals suffering from scarlet fever of Streptococcus hemolyticus naturally gave rise to the view that this organism might be the cause of the disease. This question was debated for a number of years, especially in Germany, and anti-bacterial sera were prepared by immunization of the horse to these Streptococci. Such sera received a rather widespread therapeutic trial; opinion concerning them remained, however, divided, certain investigators believing them efficacious, while others denied that their use brought about any noticeable alteration in the course of the disease. These sera were prepared by the direct subcutaneous or intravenous injection of Streptococci.

In the course of my investigations of scarlet fever certain striking analogies between this disease and diphtheria became apparent. Working on this basis attempts were made to prepare anti-toxic sera, by methods analogous to those employed for the preparation of the diphtheria anti-toxin. It was shown however that Streptoccocus hemolyticus does not yield a soluble toxin when grown outside of the animal body, so that the diphtheria technique proved inapplicable for this purpose.

Difficulties were also encountered in producing the infection in animals. For example, the injection of moderate doses of the Streptococcus into guinea pigs, either intraperitoneally or subcutaneously, produces no infection, owing to the deleterious or destructive action of the body fluids upon the bacteria. It was found however that scarlet fever could be induced experimentally in guinea pigs by the novel expedient of introducing a small quantity of fluid agar or equivalent nutrient medium by subcutaneous inoculation and allowing the same to solidify somewhat; and then injecting Streptococci into this mass. The agar appears to protect the Streptococci from the deleterious influence of the body fluids, and to enable them to grow and to produce locally in the animal body a soluble poison which is not developed when the same bacteria are grown in agar externally of the body.

The method constituting the present invention is based upon the foregoing observation and consists, briefly, in its now preferred embodiment, in injecting a suitable nutrient and protective medium, as agar, beneath the skin of a horse; infiltrating the same with Streptococcus scarlatinæ; and after suitable repetitions resulting in a proper degree of immunization, preparing the anti-toxic serum in the usual manner. So far as is now known the agar or equivalent medium must possess the double capability of affording proper conditions for the growth of Streptococci, and of protecting them, at least to a limited extent, from the action of the body fluids. Such medium will therefore be characterized herein as a nutrient protective medium.

Following are specific and detailed directions for preparation of the serum according to the best method now known to me; it being however understood that the invention is not restricted to the details of this procedure, and that the technique may be varied as experience may indicate, without departure from the invention.

A sound animal about ten years of age was selected for immunization. The horse was first tested for the presence of glanders. It was then bled for normal control serum and later injected with ten thousand units of tetanus anti-toxin. After these preliminaries the process of immunization was commenced.

The procedure for the first immunization injection was as follows: Fifteen cubic centimeters of ordinary one percent nutrient agar were melted and injected with an all glass syringe just under the skin in the neck rather high up toward the mane and anterior to the fore-shoulder avoiding the region of the external jugular vein, since the inflammatory process may extend to the vein and cause thrombosis, making subsequent bleeding difficult. One or two minutes after the injection of the agar the injection mass was infiltrated with ten cubic centimeters of a twenty hour phosphate buffered broth culture of S. scarlatinæ centrifugalized and resuspended in from one to two cubic centimeters of the culture broth. This injection was followed in twenty-four hours by an inflammatory swelling accompanied by fever and general lassitude. The inflammatory reaction increased and after about five days a large abscess formed which ruptured at the end of a week and discharged pus containing living Streptococci for about ten days thereafter. The ulcerated area healed in about three weeks. After healing had occurred a second similar injection was made on the opposite side of the neck, in the second instance employing twenty cubic centimeters of living culture of S. scarlatinæ resuspended in a small volume of broth. This process was repeated every three or four weeks, each time doubling the amount of culture injected until one hundred cubic centimeters of culture were reached. Thereafter the amount of culture was increased at each injection by one hundred cubic centimeters. As the immunizing progressed the abscess became smaller and of shorter duration. At varying times during the immunization the animal's coat became somewhat rough and there was a tendency for the skin to desquamate over small local areas. This first appeared slightly about two weeks after the second injection and was still pronounced after some of the later injections. Immunization was begun in April, 1923, and the first test bleeding made in October, 1923, a total period of six months. The serum from the first bleeding possessed a strong capacity to blanch the rash in an active case of scarlet fever when injected intracutaneously, 0.02 cc. blanching an area about 2.5 cm. in diameter. Immediately after this test the animal was bled and the serum obtained showed successful therapeutic results. Since then the animal has been alternately injected and bled. Immunizing injections are made about one week after each bleeding and consist of about 500 cc. of living culture. Three weeks following the immunizing injection the local abscess is healed, and the animal is bled to the amount of 12 liters.

The culture of S. scarlatinæ N. Y. V. used for immunization is preserved in the following manner: It is passed through white mice either daily, every three days, or once a week in order to maintain its virulence. Re-cultivations are made from the heart's blood of the mouse. The mice are injected intraperitoneally with doses of from 0.1 cc. to 1.0 cc. of broth culture depending on the virulence of the organism. From time to time the organism is tested for its capacity to produce the characteristic condition in guinea pigs of about 250 gms. weight, preferably white. This condition consists in fever, loss of weight, leucocytosis, transient erythema and after about ten days desquamation of the skin, especially over the pads of the feet. The guinea pigs were injected in the following manner: Two or three cubic centimeters of melted one percent nutrient agar are injected immediately beneath the skin of the abdomen. The agar is then infiltrated with from ten to thirty cubic centimeters of a twenty hour buffered broth culture of S. scarlatinæ. An abscess forms as in the horse and the best results are obtained when this abscess does not rupture too soon, for instance within the first 48 hours. The culture when not being passed through mice or guinea pigs is preserved on ice in rabbit's blood broth.

The serum prepared as above, when injected in small amounts (0.02 to 0.5 cc.) into the skin of a scarlet fever patient showing a florid rash, causes the local disappearance of the rash over an area varying from two to seven cm. in diameter, the rash remaining absent over this area throughout the course of the disease: in other words there appears to be neutralization in situ of the toxin of the disease. When administered intra-muscularly in larger amounts the serum causes a general disappearance of the rash, subsidence of the fever, and diminution of the general symptoms of the disease. Tests in animals show that the serum has little or no anti-bacterial action; and local neutralization of the rash indicates that it is anti-toxic in character. This serum differs therefore from those heretofore prepared in that it is essentially anti-toxic, and has little or no anti-bacterial effect.

The method hereinabove described is believed to be generally applicable in essentially similar cases, where a soluble toxin cannot be directly prepared either by growing the bacteria in a nutrient medium outside of the body, or within the body with free access of the body fluids.

I claim:—

1. Method of preparing anti-toxic sera comprising injecting into an animal body a nutrient protective medium; infiltrating the same with the desired bacterial culture; repeating the process to immunize the animal; and preparing a serum from the immunized animal.

2. Method of perparing an anti-toxic serum for the treatment of scarlet fever, comprising injecting into an animal body a nutrient protective medium; infiltrating the same with a culture of S. scarlatinæ; repeating the process to immunize the animal; and preparing a serum from the immunized animal.

3. An anti-toxic serum obtained by injecting into an animal body a nutrient protective medium; infiltrating the same with a culture of S. scarlatinæ; repeating the process to immunize the animal, and preparing a serum from the immunized animal.

In testimony whereof